United States Patent
Dragoo

[15] 3,677,111
[45] July 18, 1972

[54] METHOD FOR PRODUCING CUTTING RULES

[72] Inventor: Sherman L. Dragoo, Yorktown, Ind.
[73] Assignee: Corrugated Finishing Products, Inc., Anderson, Ind.
[22] Filed: Dec. 3, 1970
[21] Appl. No.: 94,729

[52] U.S. Cl. .............................................76/101 R, 72/324
[51] Int. Cl.........................................................B21k 21/00
[58] Field of Search ..........................76/101 R, 101 A, 101 S; 72/324

[56] References Cited
UNITED STATES PATENTS 3,089,352  5/1963  Chamouard..........................76/101 R

*Primary Examiner*—Bernard Stickney
*Attorney*—Woodard, Weikart, Emhardt & Naughton

[57] ABSTRACT

A method and apparatus for producing cutting rules. The cutting rule has a beveled edge portion with a serration formed thereon. The serration has pointed teeth which are pressed to provide a sharp cutting edge. The apparatus for producing the cutting rule has a support block supporting the cutting rule blank which is positioned under a cutting tool and a forming tool both mounted to a press. The press is operable to force the cutting tool against the cutting rule to punch a serration along the beveled edge portion. The press is also operable to force a forming tool onto the serration providing the sharp cutting edge.

6 Claims, 7 Drawing Figures

PATENTED JUL 18 1972

INVENTOR
SHERMAN L. DRAGOO
BY
Woodard Weikart Emhardt & Naughton
ATTORNEYS

METHOD FOR PRODUCING CUTTING RULES

BACKGROUND OF THE INVENTION

1. Field of the Invention

This invention is in the field of cutting devices.

2. Description of the Prior Art

One of the important modern developments in the corrugated paperboard industry has been rotary die cutting. The advent of high speed rotary cutting which utilizes a cutting rule and anvil has enabled box plants to lower production costs, enter markets that were formerly prohibited by price and generally increase the profitability of once marginal work. To prolong the life of the anvil and to reduce the pressure required to force the cutting rule through the paperboard, it was found essential that the rule have a serrated cutting edge. Thus, the initial penetration is made, not by a straight cutting edge, but by the sharp points of individual teeth. Further, as the cutting rule proceeds through the paperboard, the cut is a slicing action caused by the movement of the paperboard up the angled cutting edges of each tooth as the anvil forces the paperboard against the die. Therefore, the ability to economically produce steel cutting rule with an effective serrated cutting edge has been a vital factor in the increasing popularity of rotary die cutting.

This invention deals with an improved method and apparatus of producing serrated cutting rules. A method which at the same time is more economical and produces a better quality rule. The method involves cold forming the serrated tooth structure into a straight edged rule. All other known techniques grind, file or otherwise abrade metal from the rule to leave the desired tooth geometry. These techniques are marked by slowness of operation, extreme perishability of the abrasive tool, undesirable changes to the temper of the steel (particularly at the cutting edge) and a difficulty in maintaining desirable uniformity of the teeth. In cold forming the teeth are all made by a die such that exact uniformity is automatic. As the steel is compressed into a cutting edge, the crystalline structure is refined to strengthen the steel in the exact areas where such increased strength is desired. Since the process lends itself to automatic operation, high speed, high volume operation is easily achieved with a correspondingly dramatic reduction in price. Die life, of course, is infinitely greater than that of files, grinding wheels or other abrasive-type tools. Further, the hazard of annealing the cutting edge by inducing excessive heat in the grinding operation, is completely eliminated. The cold formed cutting edge is remarkably clean and sharp as there are no grinding or file marks to distort the plane of the tooth. Some of the prior art in the field of cutting rules is shown in the following U.S. Pat. Nos.: 3,203,295 issued to Sauer; 3,277,764 issued to Henc; and, 3,321,874 issued to Henc.

SUMMARY OF THE INVENTION

One embodiment of the present invention is a method of making a cutting rule. Stock having a first and second face is moved into a press. A serration is punched along one portion of the stock and the serration is then pressed to provide a sharp cutting edge defining the serration.

Another embodiment of the present invention is an apparatus for producing a cutting rule from a stock of material. A support block has a flat surface to support the stock. A cutting tool mounted to a press is operable to force the stock against the flat surface and punch a serration along one portion of the stock. A forming tool connected to the press is operable to press the serration providing a sharp cutting edge thereon.

It is an object of the present invention to provide an improved method for producing a cutting rule.

It is a further object of the present invention to provide an apparatus for producing the cutting rule in accordance with the improved method disclosed herein.

Related objects and advantages of the present invention will be apparent from the following description.

DESCRIPTION OF THE PREFERRED EMBODIMENT

Figure 1:
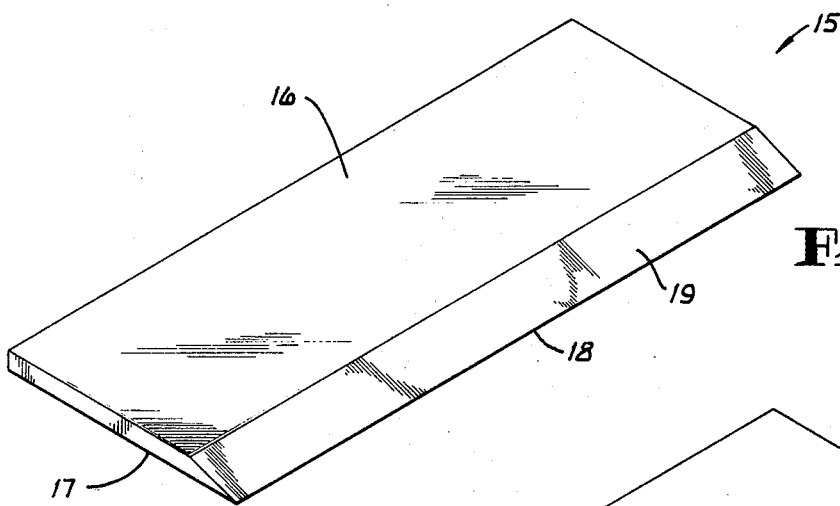
FIG. 1 is a perspective view of a stock of material used for producing a cutting rule incorporating the present invention.
Figure 2:
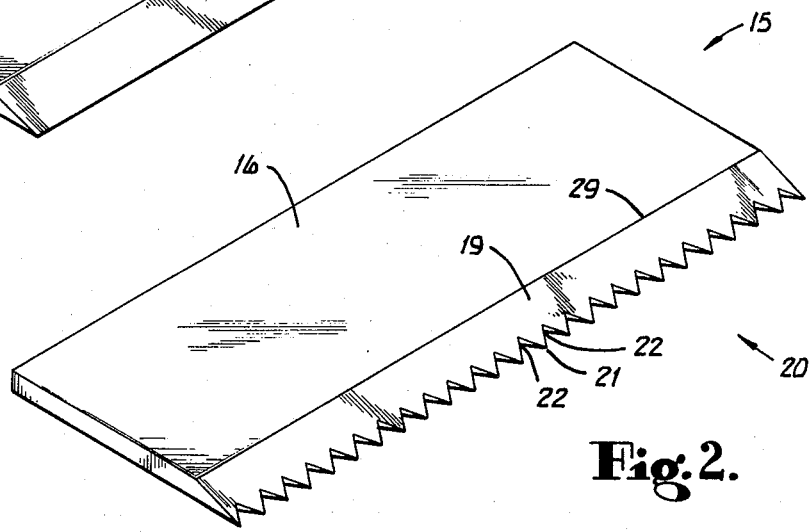
FIG. 2 is a perspective view of the stock of material of FIG. 1 after a serration has been punched into the stock.

Referring now to FIG. 1, there is shown a stock of material 15 having a pair of parallel faces 16 and 17. Beveled edge portion 19 extends from edge 18 to face 16. The length and width of stock 15 may be varied greatly depending upon the particular cutting machine to receive the cutting rule incorporating the present invention. The cutting rule has been shown in the various stages of development in FIGS. 1 through 3 in order to more fully understand the apparatus shown in FIGS. 4 through 7. FIG. 2 illustrates the stock of material 15 after a serration 20 has been formed into beveled edge portion 19. It is to be noted that the roots 22 of each tooth are positioned between the edge 29 defined by flat surface 16 and beveled end portion 19 and the tips 21 of each serration tooth. After serration 20 has been formed, or simultaneously with the formation of serration 20, the edges of each tooth are pressed on portion 19 forming tapered sides 25 and 26 (FIG. 3) and sharp cutting edges 23 and 24. The two tapered sides 25 and 26 are angularly positioned with respect to beveled edge portion 19 and extend from portion 19 to face 17. In addition, tapered side 25 is positioned angularly with respect to tapered side 26 forming line 27 which intersects the tooth root 22 and the vertex 28 of sides 25 and 26. Vertex 28 is positioned between edge 29 and tips 21. It is also to be noted that the distance 31 between adjacent vertices 28 approximately equals the distance 32 between roots 22 of adjacent teeth. Index holes 30 extend through stock 16 being positioned so as to pass through faces 16 and 17.

Figure 3:
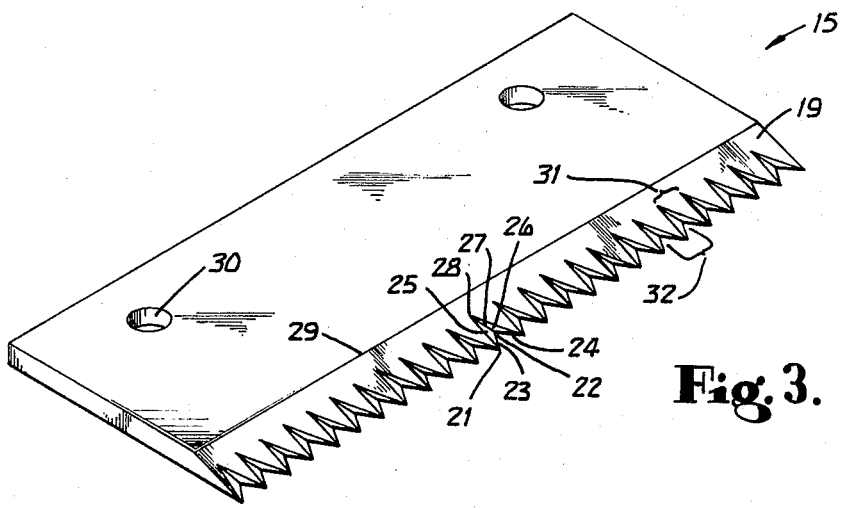
FIG. 3 is a perspective view of the stock of material of FIG. 2 after the serration has been pressed to provide a sharp cutting edge.
Figure 4:
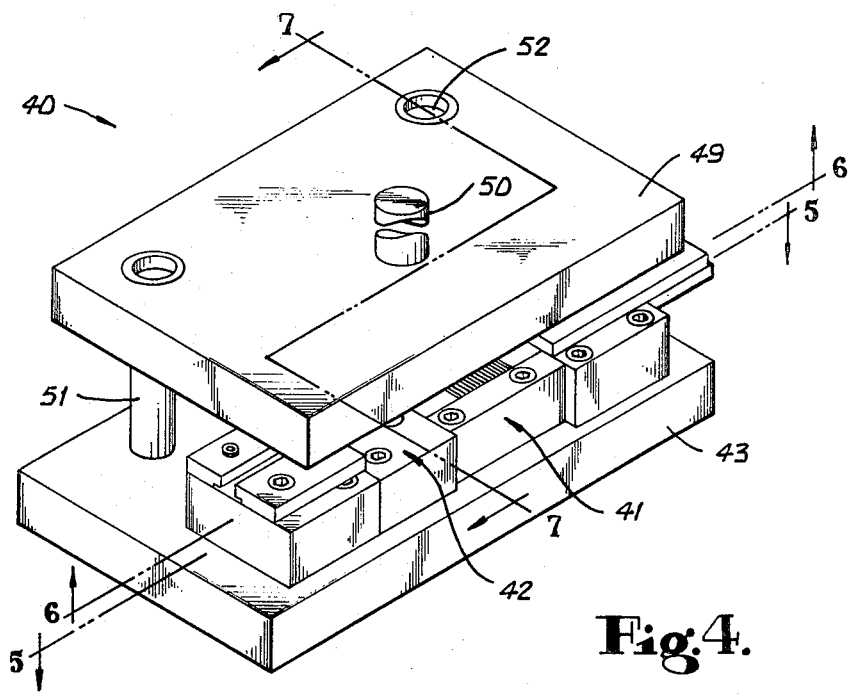
FIG. 4 is a top perspective view of an apparatus incorporating the present invention.
Figure 7:
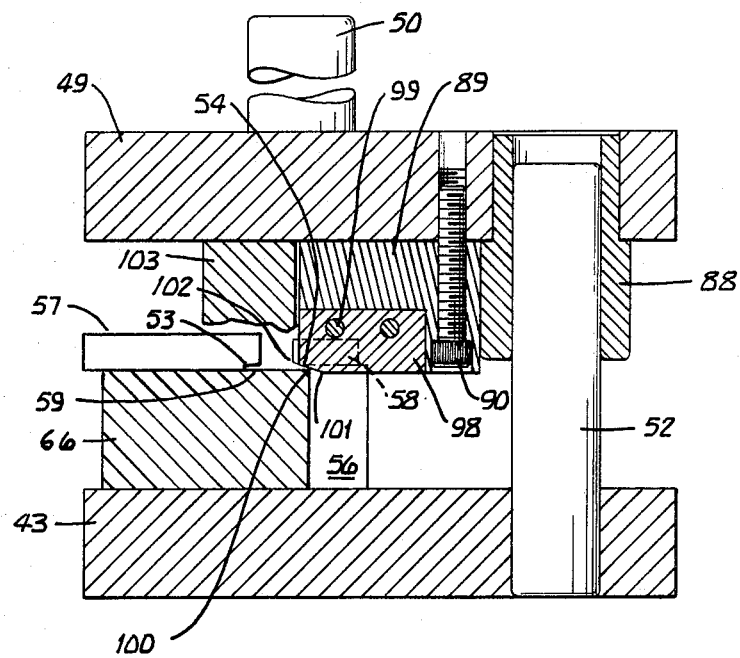
FIG. 7 is a cross-sectional view of the device of FIG. 4 taken along the line 7-7 and viewed in the direction of the arrows.
Figure 5:
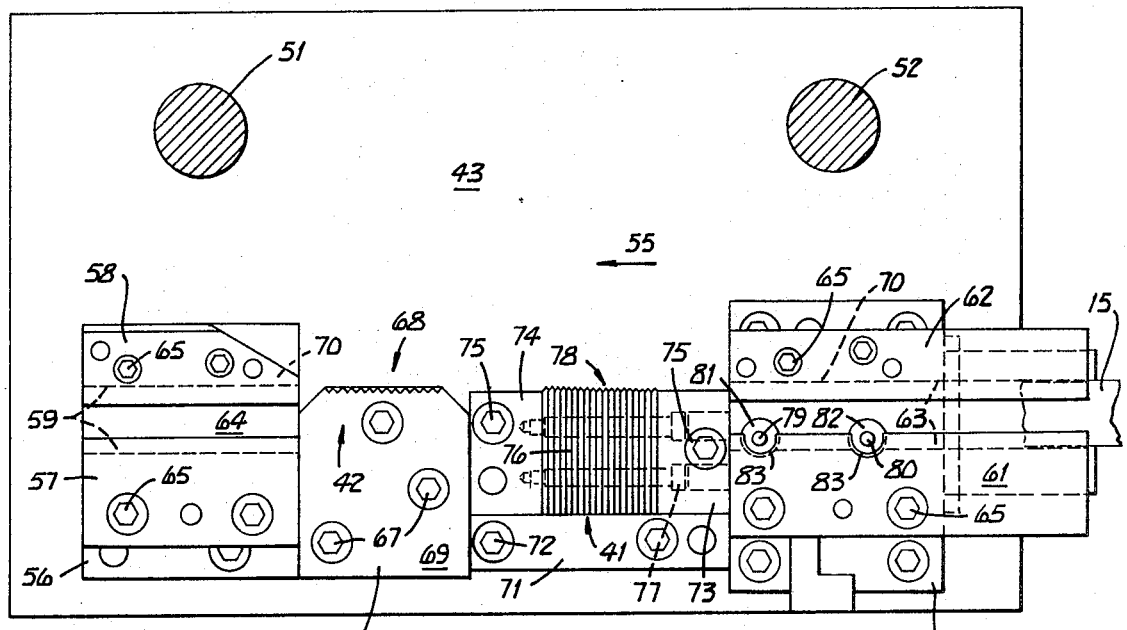
FIG. 5 is a sectional view of the device of FIG. 4 taken along the line 5—5 and viewed in the direction of the arrows.

FIG. 4 is a perspective view of the apparatus utilized to produce the cutting rule of FIG. 3. Apparatus 40 has a punching station 41 for forming the serration 20 (FIG. 2) and has a pressing station 42 for providing the sharp cutting edges 23 and 24 and the tapered sides 25 and 26 (FIG. 3). FIG. 5 is a cross-sectional view taken along the line 5—5 of FIG. 4 looking downward at base 43. Mounted atop base 43 are a pair of spacers 56 and 60. Two pairs of guide blocks 57, 58, 61 and 62 are respectively mounted atop spacers 56 and 60 by bolts 65. The heads of bolts 65 are recessed below the top surface of the guide blocks in counterbores and have shanks which are threadedly received by spacers 56 and 60. The pairs of guide blocks are spaced apart so as to form channels 59 and 63 for slidingly receiving the stock of material 15. Channel 59 will now be described it being understood that a similar description applies to channel 63. The bottom of channel 59 is defined by the top surface 64 of block 56. The lower inside edge portion of guide block 57 is cut away at 53 (FIG. 7) and the lower edge of block 58 is cut away at 54 to form a portion of the top channel 59.

Suspendedly mounted above base 43 is press plate 49 (FIG. 4) which is vertically movable on guide rods 51 and 52 fixedly secured to base 43. Plate 49 is mounted to rod 50 which moves the plate to and from base 43. Bushings 88 (FIG. 6) are mounted to plate 49 slidingly receiving guide rods 51 and 52. Fixedly mounted by bolts 85 to plate 49 is block 84 having a punch 86 and index rod 87 secured thereto. Punch 86 has a flat lower end and is received by bushing 82 (FIG. 5) secured to spacer 60. Index rod 87 has a pointed lower end and is received by bushing 81 also secured to spacer 60. Guide block 61 is cut away at 83 allowing the punch and index rod to be received respectively by holes 80 and 79 of bushings 82 and 81. As stock 15 moves through the apparatus in the direction of arrow 55, press plate 49 is lowered so as to punch holes 30 (FIG. 3) into the stock with punch 86. As each hole is punched and the stock is moved further in the direction of arrow 55, index rod 87 will be received by a hole 30. The stock of material 15 shown in FIG. 1 has only a pair of holes 30; however, it is understood that a longer stock of material may be moved through apparatus 40 thereby having many holes 30.

Mounted to the bottom of press plate 49 by bolts 90 is plate 89 having blocks 91, 92 and 93 secured thereon by bolts 94. A plurality of plates 95 are positioned between blocks 91 and 92 being secured thereto by bolts 96 having shanks freely received by plates 95 and threadedly received by block 92. The head of bolts 96 are received in counterbores provided in block 91. Likewise, a plurality of plates 98 are secured between blocks 92 and 93 by bolts 99 having shanks threadedly received by block 92. Bolts 99 have heads which are received by counterbores provided in block 93. Plates 95 have a serrated edge 97 for cutting the serration 20 shown in FIG. 2. Plates 98 have serrations 100 which have a lower edge 101 and an upper edge 102 for pressing serrations 20 and forming cutting edges 23 and 24 (FIG. 3). Mounted to base 43 at pressing station 42 is a forming plate 66 secured thereto by bolts 67. Plate 66 has a serrated edge 68 positioned in line with sides 70 of channels 59 and 63. The upper surface 69 of plate 66 is flat and in line with the lower surface 64 of channel 59. Mounted adjacent to plate 66 is spacer 71 which is secured to base 43 by bolts 72. A pair of blocks 73 and 74 are secured to spacer 71 by fastening devices 75 and are positioned on either side of a plurality of plates 76. Bolts 77 are freely received by plates 76 and are threadedly received by block 74. The heads of bolts 77 are received in counterbores in block 73. Counterbores are also provided in blocks 73 and 74 and plate 66 for receiving the heads of bolts 75 and 67. Plates 76 have a serrated edge 78 positioned in line with sides 70 and serrated edge 68. The serrated edge 78 of plate 76 is complementary to and receives the serrated edge 97 (FIG. 6) of plates 95 when press plate is in the most downward position.

Figure 6:
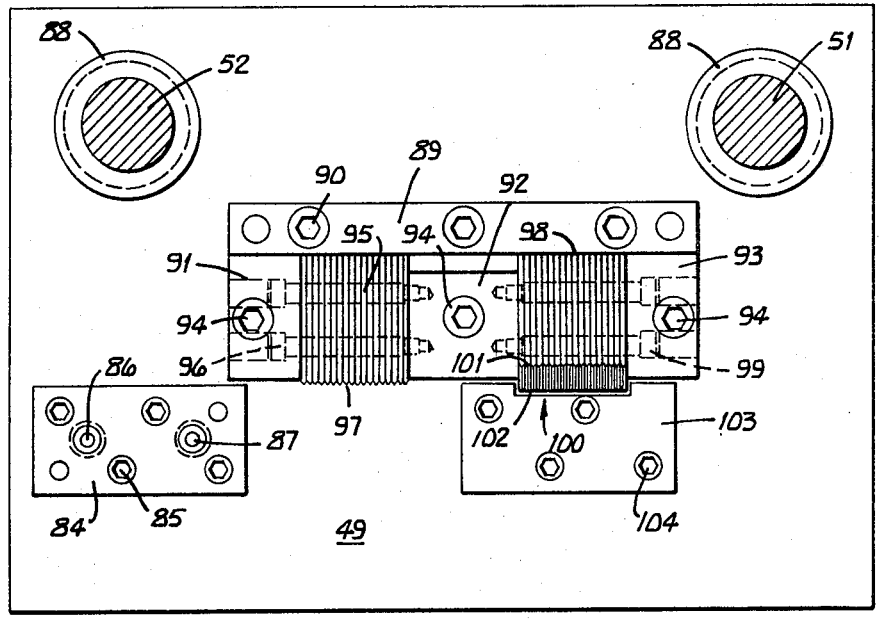
FIG. 6 is a sectional view of the device of FIG. 4 taken along the line 6—6 and viewed in the direction of the arrows and being rotated 180°.

The operation of apparatus 40 will now be described. Stock 15 is automatically advanced into channel 63 and is stopped so as to position the leading edge of the stock between punch 86 and index rod 87. Press plate 49 is then advanced downward until punch 86 passes through the stock into hole 80. Stock 15 is then advanced until the hold formed by punch 86 is positioned under index rod 87. At this time the press plate is lowered and a second hold 30 is formed into the stock. Eventually, the stock 15 will be positioned on top of the top flat surface of plates 76. At this time, press plate 49 will again be lowered until serrated edge 97 of plates 95 pass through the stock and are received by serrated edge 78 of plates 76. Thus, serrated edge 20 (FIG. 2) will be formed in stock 15. With press plate 49 in the upward position, stock 15 is then advanced until the serrations 20 previously formed are positioned over serrated edge 68 or plate 66. Press plate 49 is lowered once again thereby forming a second series of serrations 20 (FIG. 2) by plates 76 and 95. Simultaneously, with the formation of the second series of serrations 20, plates 98 abut the first set of serrations 20 formed. The lower edge 101 (FIG. 7) of serrations 100 are positioned beneath channel 59 and stock 15. The upper edge 102 of serrations 100 are positioned over channel 59 and stock 15. Serrated edge 100 is approximately parallel with beveled edge portion 19. Thus, each ridge of serrated edge 100 is received between tips 21 (FIG 3) at roots 22 to form line 27 and tapered sides 25 and 26. A spacer 103 (FIG. 6) is mounted to press plate 49 by bolts 104 and abuts the top surface of plate 66 when the press plate 49 is in the most downward position. Plate 103 has a thickness sufficient so as to prevent plates 98 from extending down sufficiently to damage plate 66. Index rod 87 positions the stock of material so as to line serrations 20 (FIG. 2) with serrated plate edge 100 (FIG. 6).

It will be evident from the above description that the present invention provides a new and improved method for making a cutting rule. It will be further evident from the above description that the present invention provides an apparatus for producing a cutting rule formed by punching a serration along one portion of a stock of material and then pressing the stock at the serration to provide a sharp cutting edge.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. A method of making a cutting rule and comprising the steps of:
   moving stock having a first and second face into a press;
   punching a serration having teeth along one portion of said stock; and,
   pressing said stock at said serration providing a sharp cutting edge defining said serration.

2. The method of claim 1 and further comprising the step of:
   providing a flat supporting surface for said second face of said stock at said serration; and wherein:
   said pressing step displaces, without removal, metal on said first face to provide a first and second tapered side for each of said teeth, each of said tapered sides extend from said first face to said second face.

3. The method of claim 2 and further comprising the step of:
   simultaneously accomplishing said punching step and said pressing step.

4. The method of claim 3 and further comprising the steps of:
   positioning said stock at a punching station and a pressing station;
   forming index holes in said stock while a plurality of teeth of said serration are retained at said punching station; and,
   moving said stock from said punching station to said pressing station in increments.

5. The method of claim 4 wherein:
   said pressing steps forms said teeth each having a first root width on said first face and a second root width on said second face, said first and second root widths are approximately equal.

6. The method of claim 5 and further comprising the step of:
   beveling said first face of said stock at said one portion.

* * * * *